United States Patent
Mihira

(10) Patent No.: US 10,306,102 B2
(45) Date of Patent: May 28, 2019

(54) ENDING WIRELESS COMMUNICATION BASED ON NUMBER OF WIRELESSLY CONNECTED TERMINALS

(71) Applicant: CANON KABUSHIKI KAISHA, Tokyo (JP)

(72) Inventor: Yoshiro Mihira, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/461,345

(22) Filed: Mar. 16, 2017

(65) Prior Publication Data

US 2017/0280010 A1    Sep. 28, 2017

(30) Foreign Application Priority Data

Mar. 24, 2016 (JP) ................. 2016-060645

(51) Int. Cl.
  *G06F 3/12* (2006.01)
  *H04N 1/333* (2006.01)
  *H04N 1/00* (2006.01)
  *H04W 4/80* (2018.01)

(52) U.S. Cl.
  CPC ..... *H04N 1/33384* (2013.01); *H04N 1/00307* (2013.01); *H04N 1/33323* (2013.01); *H04W 4/80* (2018.02); *H04N 2201/0041* (2013.01); *H04N 2201/0055* (2013.01); *H04N 2201/33364* (2013.01)

(58) Field of Classification Search
  None
  See application file for complete search history.

(56) References Cited

U.S. PATENT DOCUMENTS

| | | | | |
|---|---|---|---|---|
| 2011/0122434 A1* | 5/2011 | Kim | ....................... | G06F 3/1203 358/1.15 |
| 2014/0031078 A1* | 1/2014 | Nishikawa | ............ | H04W 40/24 455/552.1 |
| 2014/0153017 A1* | 6/2014 | Watanabe | ............. | G06F 3/1212 358/1.13 |
| 2014/0269507 A1* | 9/2014 | Tanji | .................... | H04W 76/23 370/328 |
| 2017/0223615 A1* | 8/2017 | Lee | ........................ | H04W 48/14 |

FOREIGN PATENT DOCUMENTS

JP    2014-179799 A    9/2014

* cited by examiner

*Primary Examiner* — Henok Shiferaw
(74) *Attorney, Agent, or Firm* — Canon U.S.A. Inc., IP Division

(57) ABSTRACT

In a case where a communication apparatus receives an instruction for making a printing apparatus stop operation of a direct wireless communication mode, the communication apparatus determines whether to make the printing apparatus stop the operation of the direct wireless communication mode based on information acquired from the printing apparatus through Bluetooth® Low Energy communication.

17 Claims, 10 Drawing Sheets

ENDING WIRELESS COMMUNICATION BASED ON NUMBER OF WIRELESSLY CONNECTED TERMINALS

BACKGROUND

Field

The present disclosure relates to a communication apparatus, a control method of the communication apparatus and a storage medium.

Description of the Related Art

A communication apparatus such as a smartphone including a wireless local area network (LAN) function wirelessly connects to an access point when wireless communication is executed between the communication apparatus and a device. The communication apparatus then executes wireless communication with the device via the access point.

In order to execute wireless communication between the communication apparatus and the device, a technique is provided for directly and wirelessly connecting the communication apparatus to the device without a relay apparatus such as the access point. Specifically, the device operates in a direct wireless communication mode such as a software access point mode or a Wi-Fi Direct® mode, so that the communication apparatus wirelessly connects to the device operating in the direct wireless communication mode.

Japanese Patent Application Laid-Open No. 2014-179799 discusses a technique that makes a printing apparatus operate in a direct wireless communication mode, and directly and wirelessly connects a mobile terminal to the printing apparatus operating in the direct wireless communication mode. Japanese Patent Application Laid-Open No. 2014-179799 also describes a configuration in which a communication mode is restricted from being switched if there is any session communicating in the direct wireless communication mode when the communication mode of the printing apparatus is to be switched from the direct wireless communication mode to another communication mode.

In the technique described in Japanese Patent Application Laid-Open No. 2014-179799, a user is supposed to operate the printing apparatus instead of the mobile terminal to switch the communication mode of the printing apparatus from the direct wireless communication mode to another communication mode. In the conventional technique, the user is not supposed to operate the mobile terminal to instruct the printing apparatus to end the operation of the direct wireless communication mode.

SUMMARY

According to an aspect of the present invention, a communication apparatus includes a wireless communication unit configured to wirelessly connect the communication apparatus to a printing apparatus operating in a direct wireless communication mode and a determination unit configured to determine whether to make the printing apparatus stop operation of the direct wireless communication mode based on information acquired from the printing apparatus through Bluetooth® Low Energy communication in a case where an instruction for making the printing apparatus stop the operation of the direct wireless communication mode is received from a user.

Further features will become apparent from the following description of exemplary embodiments with reference to the attached drawings.

DESCRIPTION OF THE EMBODIMENTS

Hereinafter, an exemplary embodiment will be described with reference to the appended drawings. The embodiments described hereinafter are not intended to be limiting, and not all of the combinations of features described in the exemplary embodiments are required to be implemented.

Figure 1:
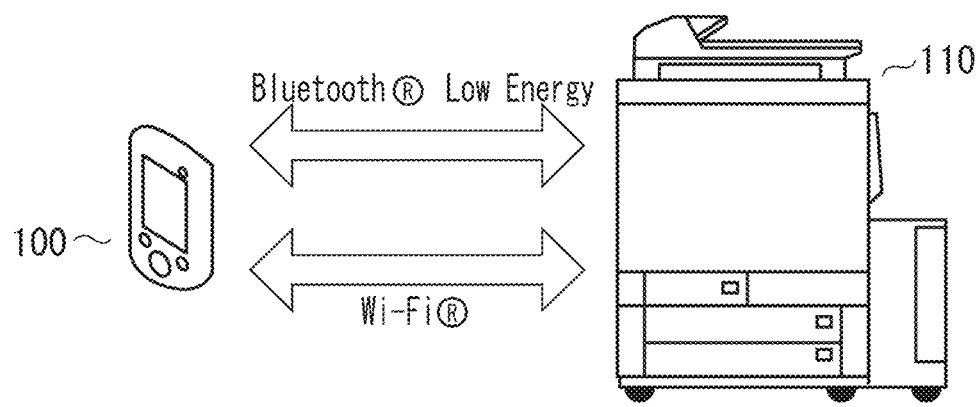
FIG. 1 is a diagram illustrating a configuration of a communication system.

Hereinafter, a first exemplary embodiment will be described. First, a general configuration of a communication system according to the present exemplary embodiment will be described with reference to FIG. 1. The communication system includes a mobile terminal 100 and a printing apparatus 110. Both the mobile terminal 100 and the printing apparatus 110 include a wireless local area network (LAN) function. The printing apparatus 110 can operate in a direct wireless communication mode. The mobile terminal 100 wirelessly connects to the printing apparatus 110 operating in the direct wireless communication mode and executes wireless communication compliant with the Wi-Fi® standard.

Both the mobile terminal 100 and the printing apparatus 110 include a Bluetooth® function, so that the mobile terminal 100 and the printing apparatus 110 can execute communication compliant with the Bluetooth® Low Energy standard.

The mobile terminal 100 in the present exemplary embodiment can instruct the printing apparatus 110 to start or end the operation of the direct wireless communication mode through Bluetooth® Low Energy communication. In particular, in the present exemplary embodiment, when a plurality of terminals is wirelessly connected to the printing apparatus 110 operating in the direct wireless communication mode, the mobile terminal 100 is prohibited from instructing the printing apparatus 110 to end the operation of the direct wireless communication mode.

Figure 2:
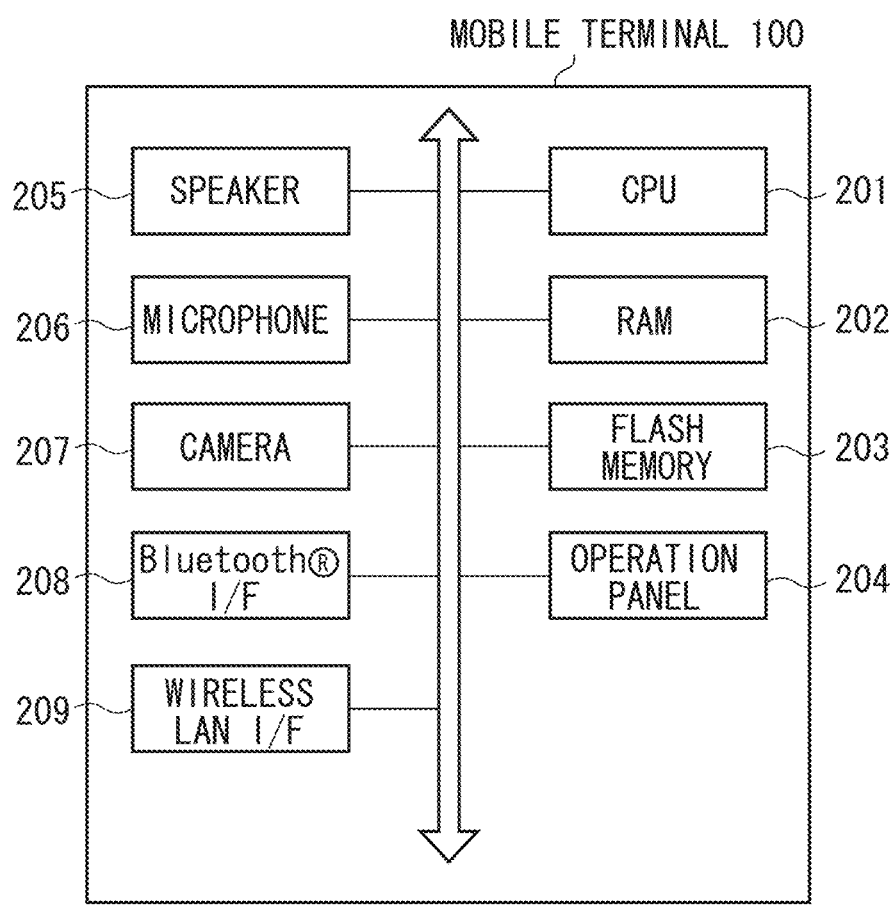
FIG. 2 is a block diagram illustrating a hardware configuration of a mobile terminal.

Next, a hardware configuration of the mobile terminal 100 will be described with reference to FIG. 2. While a smartphone will be described as an example of the mobile terminal 100 in the present exemplary embodiment, the mobile terminal 100 can be any another communication apparatus including a wireless LAN function or a Bluetooth® function.

A central processing unit (CPU) 201 reads a control program stored in a flash memory 203 and executes various types of processing for controlling the operation of the mobile terminal 100. A random access memory (RAM) 202 is used as a temporary storage area, such as a main memory or a work area of the CPU 201. The flash memory 203 is a non-volatile storage medium that stores, for example, a control program of the mobile terminal 100 or data of various types such as a photograph and electronic documents.

The mobile terminal 100 of the present exemplary embodiment, while described with respect to one CPU 201 executing each processing step illustrated in the below-described flowchart, is not limited to this configuration. For example, a plurality of CPUs can cooperatively execute each processing step illustrated in the below-described flowchart. A part of the processing steps illustrated in the below-described flowchart can also be executed using a hardware circuit such as an application specific integrated circuit (ASIC).

An operation panel 204 includes a touch panel function for detecting a touch operation performed by a user and displays various screens. The user can input a desired operation instruction to the mobile terminal 100 by performing a touch operation on the operation panel 204. In addition, the mobile terminal 100 includes hardware keys (not illustrated) so that the user can also input the operation instruction to the mobile terminal 100 using the hardware keys.

A speaker 205 and a microphone 206 enable, for example, a user to make calls. A camera 207 captures an image according to a user's image-capturing instruction. The image captured by the camera 207 is stored in a predetermined area in the flash memory 203.

A Bluetooth® interface (I/F) 208 executes wireless communication compliant with the Bluetooth® standard. The Bluetooth® I/F 208 supports the Bluetooth® Low Energy and executes Bluetooth® Low Energy communication. A wireless LAN I/F 209 includes a wireless LAN function and executes wireless communication compliant with the Wi-Fi® standards such as the Institute of Electrical and Electronics Engineers (IEEE) 802.11a, 802.11b, 802.11g, 802.11n, or 802.11ac.

Figure 3:
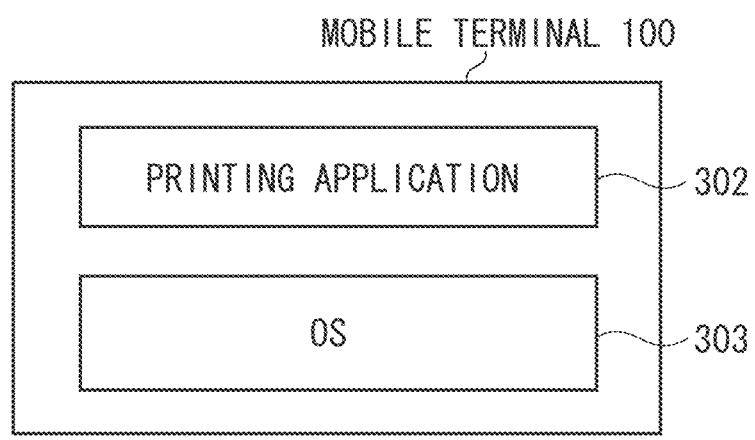
FIG. 3 is a block diagram illustrating a software configuration of the mobile terminal.

Next, a software configuration of the mobile terminal 100 will be described with reference to FIG. 3. FIG. 3 is a functional block diagram realized by the CPU 201 by executing a control program stored in the flash memory 203.

An operating system (OS) 301 is software for controlling the operation of the mobile terminal 100. Various applications can be installed in the mobile terminal 100 in addition to a printing application 302 described below. The OS 301 controls the operation of the mobile terminal 100 according to an instruction received from each application or an operation instruction input by the user through the operation panel 204.

The printing application 302 is an application that provides a printing function to the user. The printing application 302 instructs the OS 301 to search for a printing apparatus, generate print data, and transmit the generated print data.

While various applications other than the printing application 302 are installed in the mobile terminal 100, description related to the other applications are omitted herein.

Figure 4:
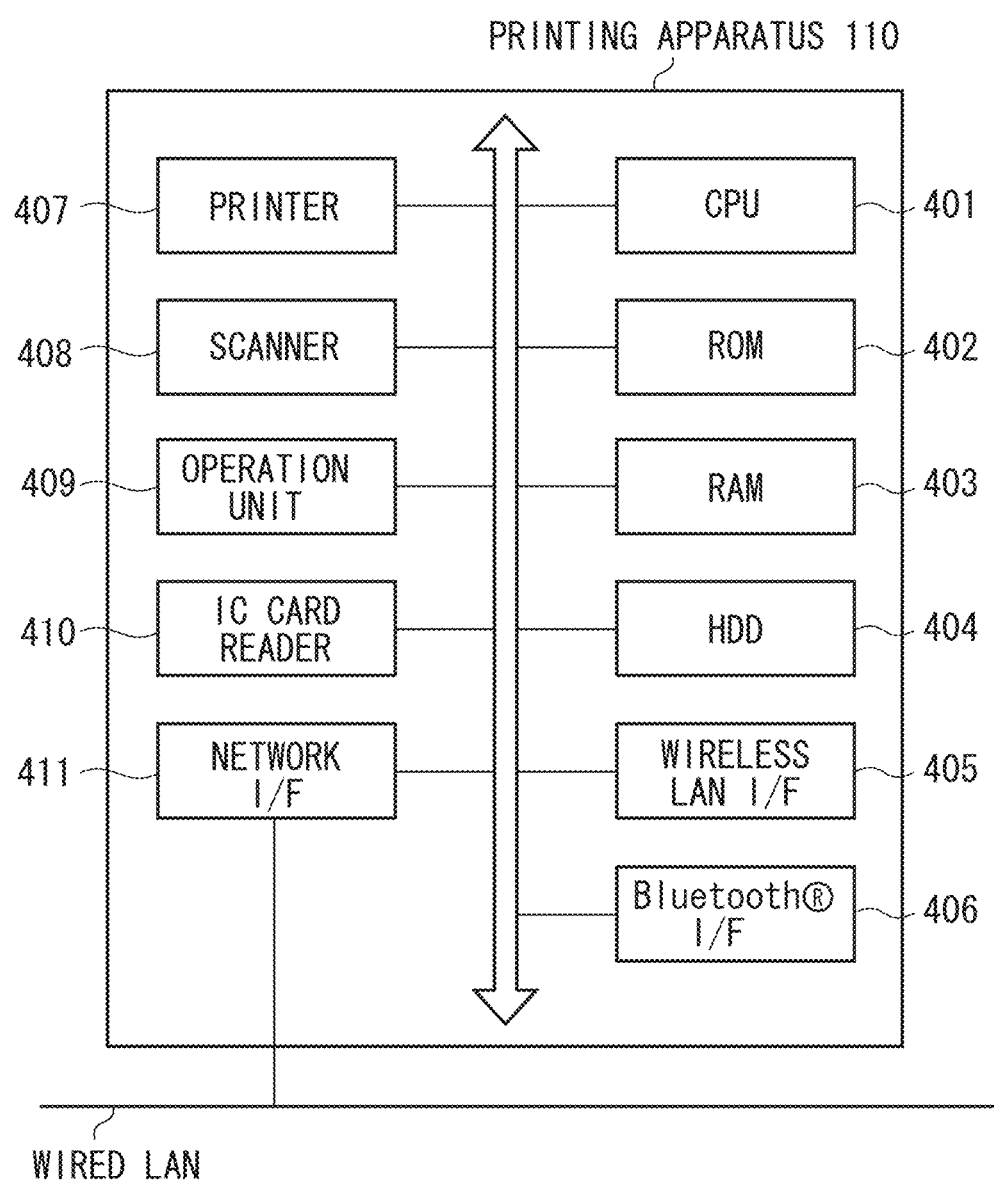
FIG. 4 is a block diagram illustrating a hardware configuration of a printing apparatus.

Next, a hardware configuration of the printing apparatus 110 will be described with reference to FIG. 4. The printing apparatus 110 is an example of a device.

A CPU 401 reads a control program stored in a read only memory (ROM) 402 and executes various types of processing for controlling the operation of the printing apparatus 110. The ROM 402 stores a control program. A RAM 403 is used as a temporary storage area, such as a main memory or a work area of the CPU 401. A hard disk drive (HDD) 404 is a non-volatile storage medium for storing various types of data.

A wireless LAN I/F 405 includes a wireless LAN function and executes wireless communication compliant with the Wi-Fi® standards such as the IEEE 802.11a, 802.11b, 802.11g, 802.11n, or 802.11ac. The wireless LAN I/F 405 can operate in a direct wireless communication mode. When the wireless LAN I/F 405 operates in the direct wireless communication mode, the printing apparatus 110 generates a service set identifier (SSID) and a security key, so as to operate as an access point. Then, when the mobile terminal 100 wirelessly connects to the access point indicated by the SSID generated by the printing apparatus 110, wireless communication can be directly executed by the mobile terminal 100 and the printing apparatus 110. While, in the present exemplary embodiment, the software access point mode will be described as an example of the direct wireless communication mode, any other applicable communication mode, such as Wi-Fi Direct® can be also used.

A Bluetooth® I/F 406 executes wireless communication compliant with the Bluetooth® standard. The Bluetooth® I/F 406 supports the Bluetooth® Low Energy and executes Bluetooth® Low Energy communication.

A network I/F 411 communicates with an external apparatus such as a personal computer (PC) connected to the wired LAN.

A printer 407 executes printing processing on a sheet based on print data received through the wireless LAN I/F 405 or the network I/F 411. A scanner 408 reads a document placed on a platen (not illustrated) and generates a document image. The document image generated by the scanner 408 is printed by the printer 407 (i.e., copy processing) or stored in the HDD 404.

An operation unit 409 includes a liquid crystal display unit including a touch panel function and a keyboard, and displays various operation screens. The user can input an instruction or information with respect to the printing apparatus 110 via the operation unit 409. An integrated circuit (IC) card reader 410 reads user information from an IC card. The printing apparatus 110 uses the user information read by the IC card reader 410 to execute authentication processing.

Next, processing for wirelessly connecting the mobile terminal 100 to the printing apparatus 110 operating in the direct wireless communication mode will be described with reference to FIGS. 5A to 5C and FIG. 6.

Figure 5A:
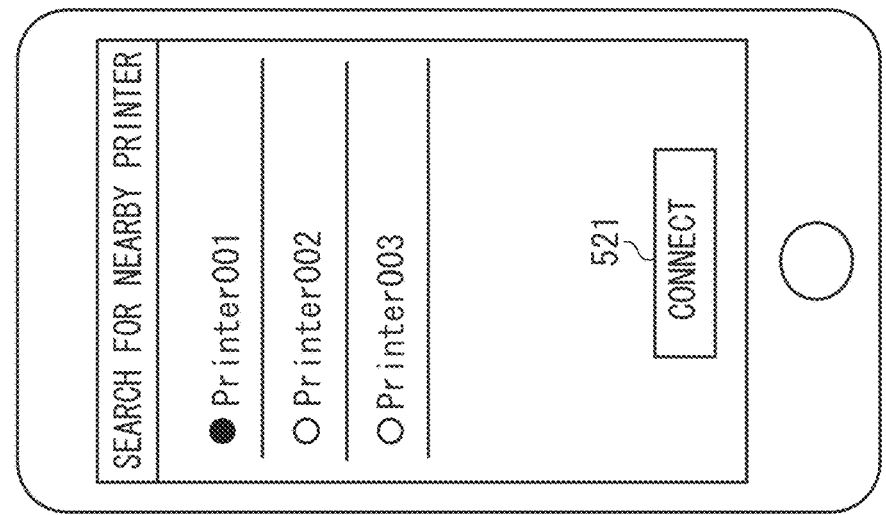
FIGS. 5A, 5B, and 5C are diagrams illustrating screens displayed by the mobile terminal.
Figure 5B:

First, a user uses the mobile terminal 100 to search for nearby devices, and selects one device (i.e., printing apparatus 110) from among the plurality of detected devices to which the user would like to wirelessly connect the mobile terminal 100 to. A search screen 500 in FIG. 5A is a screen displayed on the operation panel 204 of the mobile terminal 100, which is provided by the printing application 302. A search start button 501 is displayed on the search screen 500. When the user presses the search start button 501, the printing application 302 instructs the OS 301 to execute search processing, so that the OS 301 controls the mobile terminal 100 to execute the search processing. In the present exemplary embodiment, the devices including the printing apparatus 110 transmit Bluetooth® Low Energy advertising packets at predetermined time intervals. The mobile terminal 100 receives the advertising packets to search for nearby devices. While the mobile terminal 100 is executing the search processing, the operation panel 204 of the mobile terminal 100 displays a search state screen 510 in FIG. 5B. The search state screen 510 is a screen provided by the printing application 302.

Figure 5C:
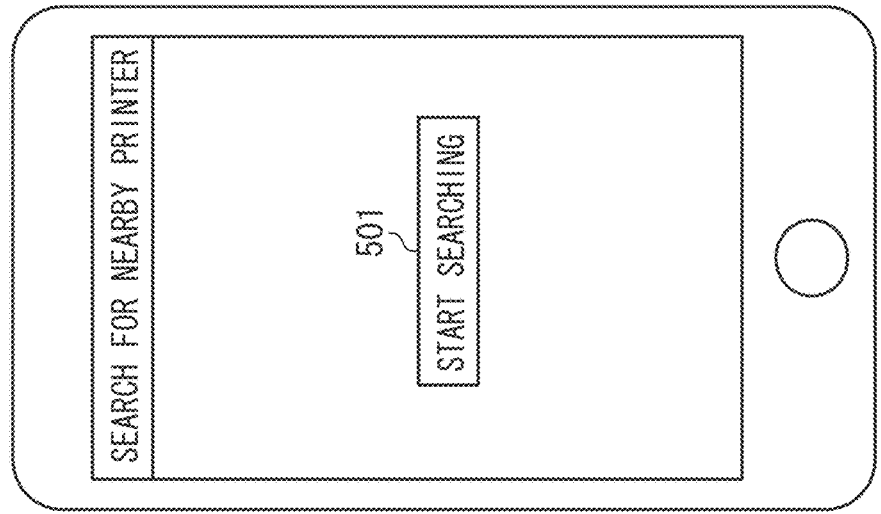

When the search processing is completed, the operation panel 204 of the mobile terminal 100 displays a search result screen 520 in FIG. 5C. The search result screen 520 is a screen provided by the printing application 302. In the present exemplary embodiment, the printing application 302 determines that the search processing is completed when a predetermined time (e.g., 10 seconds) has elapsed after the search processing is started.

Devices detected through the search processing are displayed on the search result screen 520. The search result screen 520 illustrates a state where three devices are detected through the search processing as an example. Because the Bluetooth® Low Energy advertising packet includes a device name, the device name is displayed on the search result screen 520 as identification information of the device. In the present exemplary embodiment, if a value of reception radio field intensity of the advertising packet that the mobile terminal 100 receives from one device is less than a predetermined threshold value, the device is regarded as a device remote from the mobile terminal 100, and thus the device is not displayed on the search result screen 520. In other words, the devices displayed on the search result screen 520 are devices in proximity to the mobile terminal 100. In the search result screen 520, the devices can be arranged and displayed in an order starting from a device closest to the mobile terminal 100.

The user can select a desired device in the search result screen 520. The search result screen 520 illustrates a state where the user has selected "Printer 001". When the user selects a desired device and presses a connect button 521, the mobile terminal 100 is connected to the device selected by the user.

Figure 6:
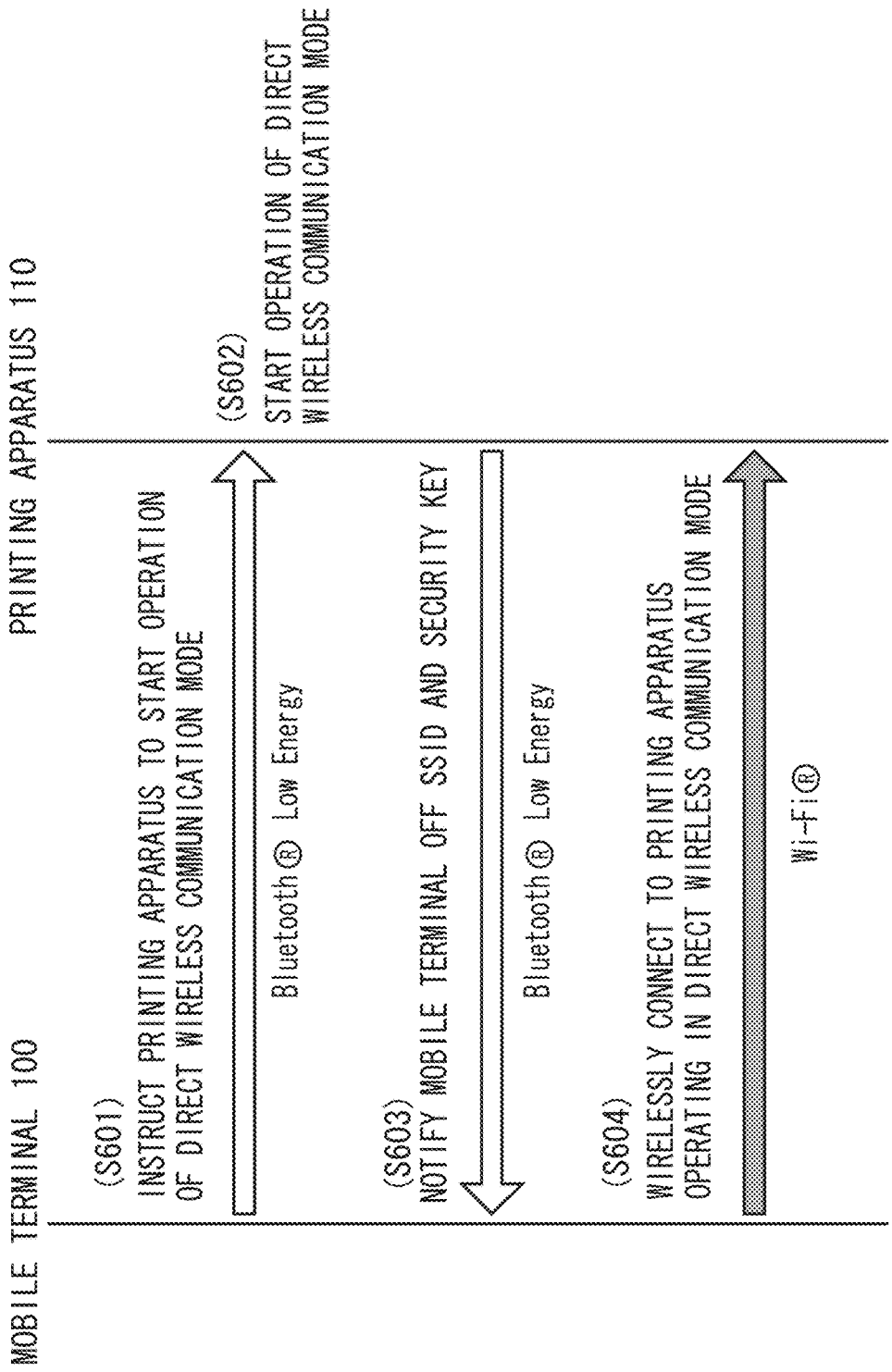
FIG. 6 is a sequence diagram illustrating processing for wirelessly connecting the mobile terminal to the printing apparatus.

FIG. 6 is a sequence diagram illustrating processing executed when the mobile terminal 100 is connected to the device. Hereinafter, the exemplary embodiment will be described based on the assumption that the user has selected the printing apparatus 110 in the search result screen 520.

When the user selects the printing apparatus 110 and presses the connect button 521 in the search result screen 520, in step S601, the Bluetooth® I/F 208 of the mobile terminal 100 instructs the printing apparatus 110 to start operation of the direct wireless communication mode. The processing in step S601 is realized when the printing application 302 instructs the OS 301 to execute the processing. The Bluetooth® I/F 208 executes generic attribute profile (GATT) communication defined by the Bluetooth® Low Energy and instructs the printing apparatus 110 to start operation of the direct wireless communication mode.

In step S602, the printing apparatus 110, after receipt of the instruction in step S601, starts operation of the direct wireless communication mode, and generates an SSID and a security key used in the direct wireless communication mode.

Next, in step S603, the Bluetooth® I/F 406 of the printing apparatus 110 notifies the mobile terminal 100 of the generated SSID and the security key as a response to the instruction received in step S601.

In step S604, the wireless LAN I/F 209 of the mobile terminal 100 uses the security key provided in step S603 to wirelessly connect to the access point indicated by the SSID notified in step S603. Through the above processing, the mobile terminal 100 directly and wirelessly connects to the printing apparatus 110 operating in the direct wireless communication mode.

Figure 8C:
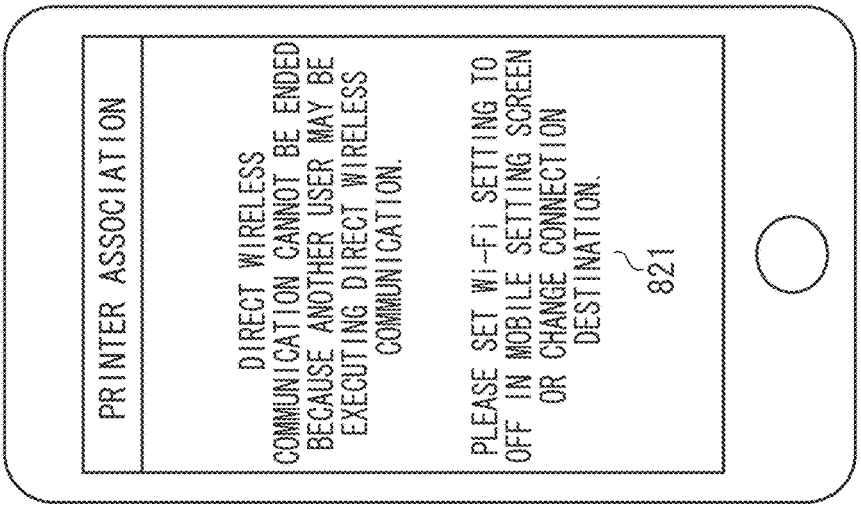
FIGS. 8A, 8B, and 8C are diagrams illustrating screens displayed by the mobile terminal.
Figure 8B:
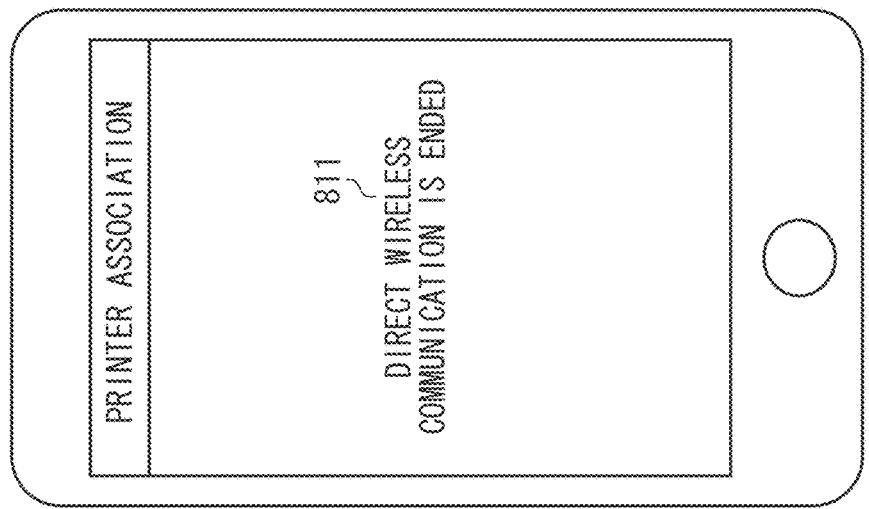
Figure 8A:
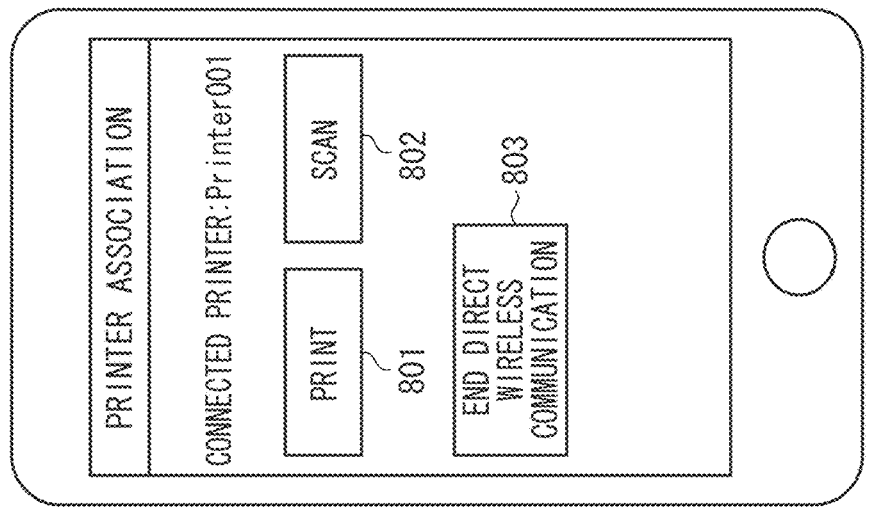

When the mobile terminal 100 wirelessly connects to the printing apparatus 110 operating in the direct wireless communication mode, the operation panel 204 of the mobile terminal 100 displays a printer association screen 800 in FIG. 8A. The printer association screen 800 is a screen provided by the printing application 302.

A print button 801, a scan button 802, and an end-direct-wireless-communication button 803 are displayed on the printer association screen 800. The print button 801 and the scan button 802 are buttons for using a printing function and a scanning function of the printing apparatus 110. When the user presses the print button 801 or the scan button 802, a function screen (not illustrated) according to the selected button is displayed thereon, so that the user can use the printing function or the scanning function of the printing apparatus 110. The end-direct-wireless-communication button 803 is used for instructing a device to which the mobile terminal 100 is wirelessly connected (i.e., in the present exemplary embodiment, the printing apparatus 110) to end the operation of the direct wireless communication mode.

Figure 7:
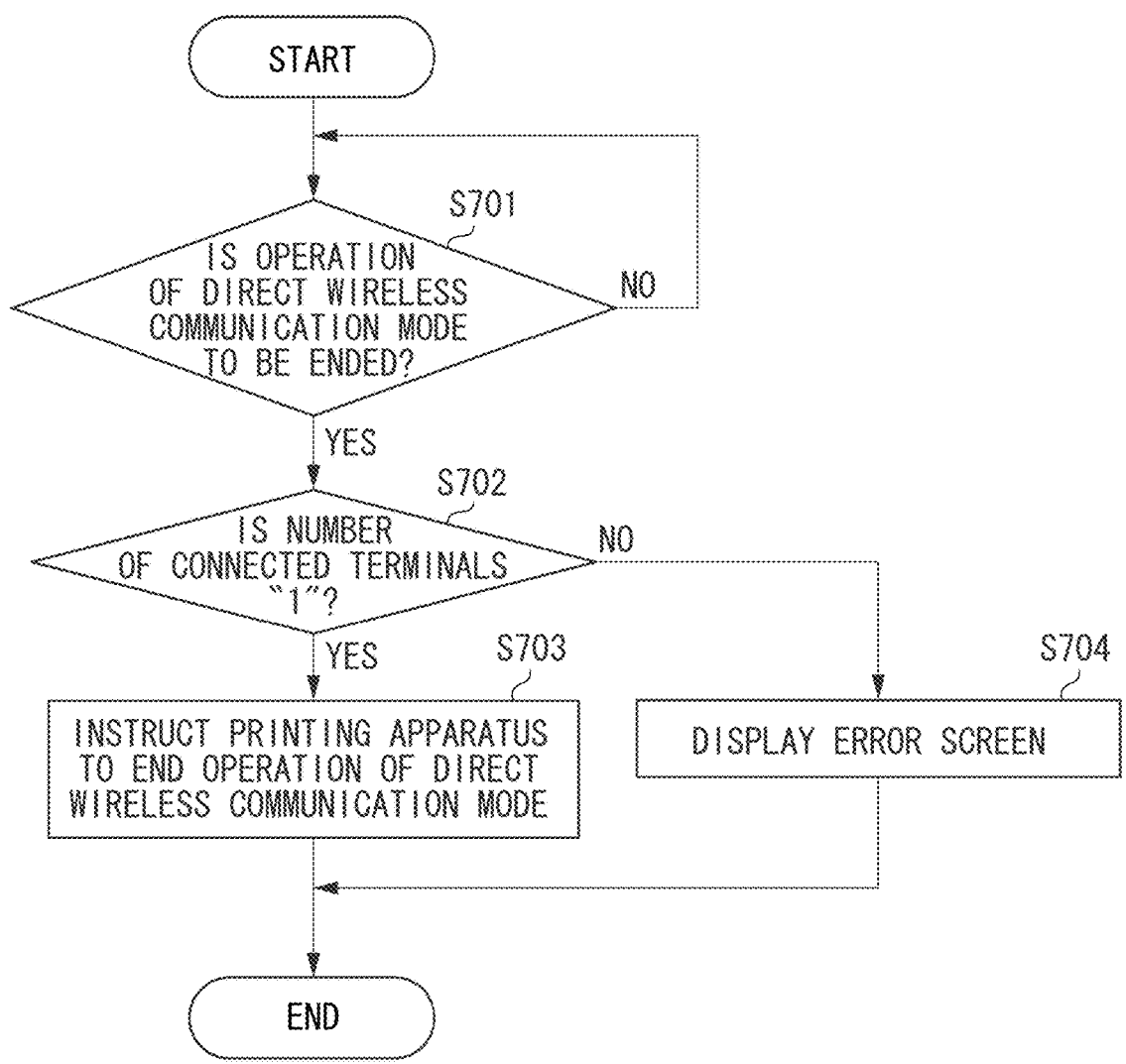
FIG. 7 is a flowchart illustrating processing executed by the mobile terminal.

FIG. 7 is a flowchart illustrating processing executed when the mobile terminal 100 instructs the printing apparatus 110 to end the operation of the direct wireless communication mode. The CPU 201 loads a control program stored in a memory, such as the flash memory 203, to the RAM 202 and executes the control program so that each step illustrated in the flowchart in FIG. 7 is processed thereby. The mobile terminal 100 can be configured in such a manner that the CPU 201 executes at least a part of the steps of the flowchart in FIG. 7 while the rest of the steps are executed by another CPU (not illustrated) different from the CPU 201. The processing illustrated in the flowchart in FIG. 7 is executed when the printing application 302 displays the printer association screen 800.

First, in step S701, the printing application 302 determines whether the operation of the printing apparatus 110 in the direct wireless communication mode should end. When the user presses the end-direct-wireless-communication button 803 in the printer association screen 800 (YES in step S701), the printing application 302 determines that the operation of the printing apparatus 110 in the direct wireless communication mode should end and the processing then proceeds to step S702. If the user does not press the end-direct-wireless-communication button 803 (NO in step S701), the printing application 302 waits until the user presses the end-direct-wireless-communication button 803. The processing described in step S701 is realized by the CPU 201.

In step S702, the printing application 302 determines whether a number of terminals wirelessly connected to the printing apparatus 110 operating in the direct wireless communication mode is "1". The printing application 302 instructs the OS 301 to inquire the printing apparatus 110 of the number of terminals wirelessly connected to the printing apparatus 110. Then, through the control executed by the OS 301, the Bluetooth® I/F 208 executes GATT communication to inquire with the printing apparatus 110 the number of terminals wirelessly connected to the printing apparatus 110. When the Bluetooth® I/F 208 receives a response from the printing apparatus 110, the response is transmitted to the printing application 302 from the OS 301. If the response from the printing apparatus 110 indicates that the number of terminals wirelessly connected to the printing apparatus 110 is "1" (YES in step S702), the processing proceeds to step S703. If the response from the printing apparatus 110 indicates that the number of terminals wirelessly connected to the printing apparatus 110 is "2" or more (NO in step S702), the processing proceeds to step S704. The processing described in step S702 is realized by the CPU 201.

Next, step S703 will be described. In step S703, the printing application 302 instructs the printing apparatus 110 to end the operation of the direct wireless communication mode. The printing application 302 instructs the OS 301 to instruct the printing apparatus 110 to end the operation of the direct wireless communication mode. Then, through the control executed by the OS 301, the Bluetooth® I/F 208 executes GATT communication to instruct the printing apparatus 110 to end the operation of the direct wireless communication mode. The printing apparatus 110, after receipt of the instruction for ending the operation of the direct wireless communication mode, ends the operation of the direct wireless communication mode. Further, the operation panel 204 of the mobile terminal 100 displays a notification screen 810 in FIG. 8B. The notification screen 810 is a screen provided by the printing application 302, and a message 811 indicating that the operation of the printing apparatus 110 in the direct wireless communication mode has ended is displayed thereon. The processing described in step S703 is realized by the CPU 201.

When the number of terminal wirelessly connected to the printing apparatus 110 is "1", the terminal wirelessly connected to the printing apparatus 110 is only the mobile terminal 100. In this case, the operation of the printing apparatus 110 in the direct wireless communication mode can be ended without any problem. Therefore, in the present exemplary embodiment, when the number of terminals wirelessly connected to the printing apparatus 110 is "1", the printing application 302 instructs the printing apparatus 110 to end the operation of the direct wireless communication mode. In other words, the mobile terminal 100 can instruct the printing apparatus 110 to end the operation of the direct wireless communication mode when the number of terminals wirelessly connected to the printing apparatus 110 is "1".

Next, step S704 will be described. In step S704, the printing application 302 displays an error screen without ending the operation of the printing apparatus 110 in the direct wireless communication mode. An error screen 820 in FIG. 8C is a screen displayed on the operation panel 204 of the mobile terminal 100 in step S703. The error screen 820 is provided by the printing application 302, and a message 821 indicating that the operation of the printing apparatus 110 in the direct wireless communication mode cannot be ended is displayed thereon. The processing described in step S703 is realized by the CPU 201.

When the number of terminals wirelessly connected to the printing apparatus 110 is "2" or more, there is a terminal other than the mobile terminal 100 wirelessly connected to the printing apparatus 110. If the operation of the printing apparatus 110 in the direct wireless communication mode is ended in such a state, the wireless connection of another terminal will also be cut off. Therefore, in the present exemplary embodiment, when the number of terminals wirelessly connected to the printing apparatus 110 is "2" or more, the operation of the printing apparatus 110 in the direct wireless communication mode will not be ended. In other words, the mobile terminal 100 does not instruct the printing apparatus 110 to end the operation of the direct wireless communication mode when the number of terminals wirelessly connected to the printing apparatus 110 is "2" or more.

As described above, according to the present exemplary embodiment, whether to enable the mobile terminal 100 to instruct the device (printing apparatus 110) to end the operation of the direct wireless communication mode is determined based on the number of terminals wirelessly connected to the device. If the number of terminals wirelessly connected to the device is "1", and thus only the mobile terminal 100 is connected thereto, the mobile terminal 100 can instruct the device to end the operation of the direct wireless communication mode. If the number of terminals wirelessly connected to the device is "2" or more, and thus a terminal other than the mobile terminal 100 is wirelessly connected to the printing apparatus 110, the mobile terminal 100 is cannot instruct the device to end the operation of the direct wireless communication mode.

As a variation example of the present exemplary embodiment, the end-direct-wireless-communication button 803 may not be displayed when the number of terminals wirelessly connected to the device is "2" or more. When the number of terminals wirelessly connected to the device is "2" or more, the mobile terminal 100 can be controlled so as not to execute any processing even if the user presses the end-direct button 803, while the end-direct button 803 is displayed.

Next, a second exemplary embodiment will be described. In the present exemplary embodiment, whether to enable a communication apparatus to instruct a device to end the operation of the direct wireless communication mode is determined based on setting of the SSID used in the direct wireless communication mode. A configuration of a communication system in the present exemplary embodiment is similar to the configuration described in the first exemplary embodiment, and thus a description thereof is omitted.

Figure 9:
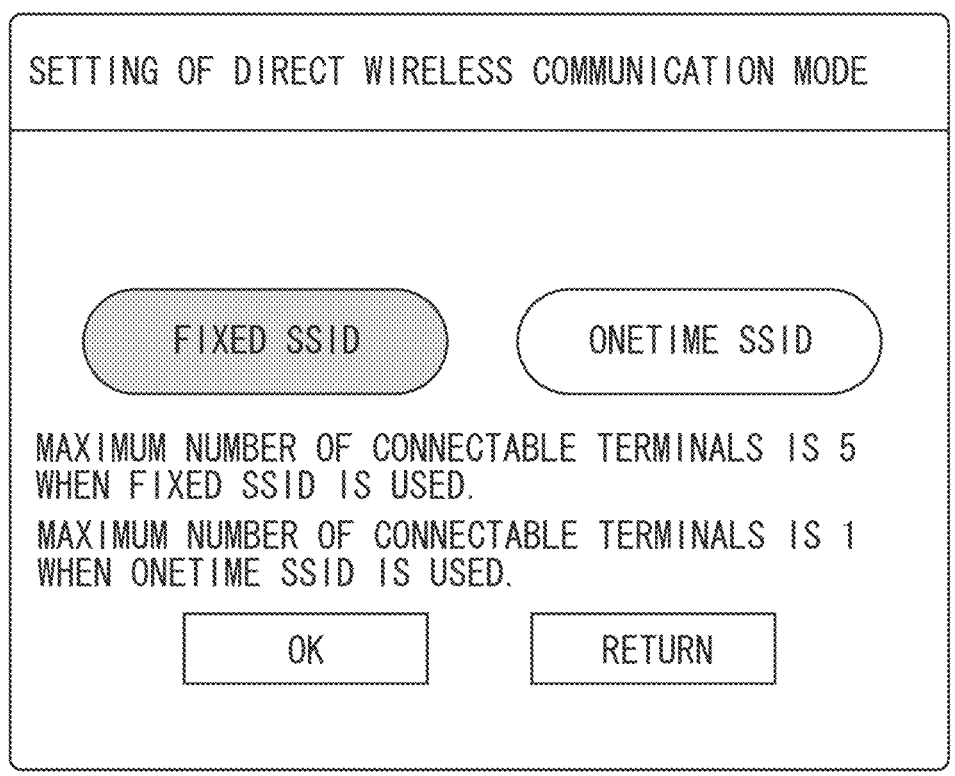
FIG. 9 is a diagram illustrating a screen displayed by the printing apparatus.

A setting screen 900 in FIG. 9 is a screen for setting a type of the SSID used in the direct wireless communication mode, which is displayed on the operation unit 409 of the printing apparatus 110. In the present exemplary embodiment, two types of SSIDs, i.e., a fixed SSID and a onetime SSID, are provided. A user selects the fixed SSID or the onetime SSID to set the selected SSID as an SSID used in the direct wireless communication mode. The setting screen 900 illustrates a state where the user has selected the fixed SSID.

When the fixed SSID is selected, the same SSID is generated every time the printing apparatus 110 operates in the direct wireless communication mode. The user previously sets what kind of SSID is to be generated as the fixed SSID to the printing apparatus 110 through a setting screen (not illustrated). In the present exemplary embodiment, when the fixed SSID is used in the direct wireless communication mode, the maximum number of terminals wirelessly connectable to the printing apparatus 110 operating in the direct wireless communication mode is set as "5". However, the maximum number thereof is not limited to "5", and another value of "2" or more can be set as the maximum number.

When the onetime SSID is selected, an SSID is randomly generated every time the printing apparatus 110 operates in the direct wireless communication mode. In the present exemplary embodiment, when the onetime SSID is used in the direct wireless communication mode, the maximum number of terminals wirelessly connectable to the printing apparatus 110 operating in the direct wireless communication mode is set as "1".

In the present exemplary embodiment, processing for wirelessly connecting the mobile terminal 100 to the printing apparatus 110 operating in the direct wireless communication mode is similar to the processing described in the first exemplary embodiment. Through the processing described in FIGS. 5A to 5C and FIG. 6, the mobile terminal 100 is wirelessly connected to the printing apparatus 110 operating in the direct wireless communication mode. When the mobile terminal 100 is wirelessly connected to the printing apparatus 110 operating in the direct wireless communication mode, the operation panel 204 of the mobile terminal 100 displays the printer association screen 800 in FIG. 8A.

Figure 10:
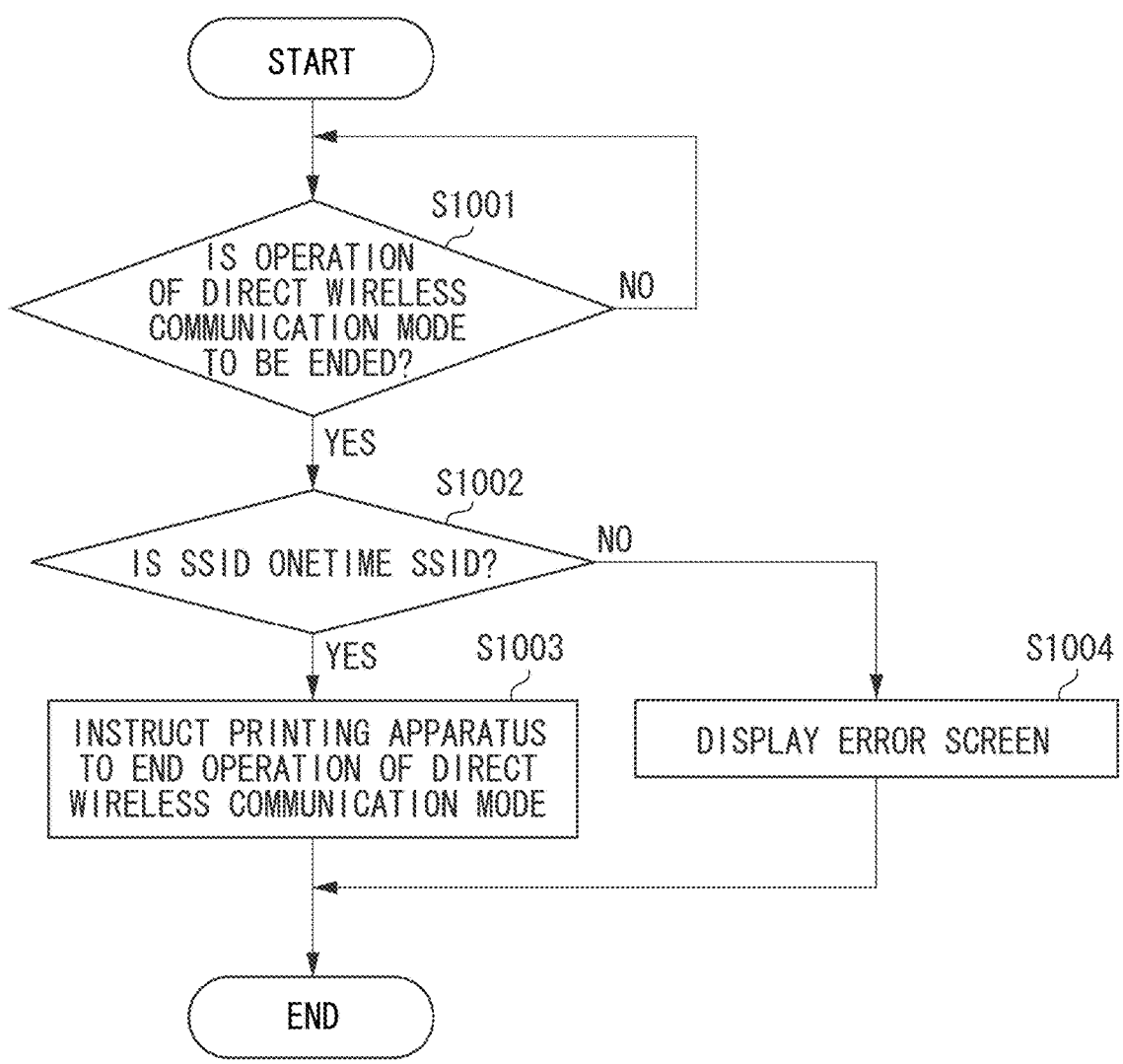
FIG. 10 is a flowchart illustrating processing executed by the mobile terminal.

Next, processing executed when the mobile terminal 100 instructs the printing apparatus 110 to end the operation of the direct wireless communication mode will be described with reference to the flowchart in FIG. 10. The CPU 201 loads a control program stored in a memory, such as the flash memory 203, to the RAM 202 and executes the control program so that each step illustrated in the flowchart in FIG. 10 is processed thereby. The mobile terminal 100 can be configured in such a manner that the CPU 201 executes at least a part of the steps of the flowchart in FIG. 10 while the rest of the steps are executed by another CPU (not illustrated) different from the CPU 201. The processing illustrated in the flowchart in FIG. 10 is executed when the printing application 302 displays the printer association screen 800.

First, in step S1001, the printing application 302 determines whether the operation of the printing apparatus 110 in the direct wireless communication mode should end. When the user presses the end-direct-wireless-communication button 803 in the printer association screen 800 (YES in step S1001), the printing application 302 determines that the operation of the printing apparatus 110 in the direct wireless communication mode is to be ended, so that the processing proceeds to step S1002. If the user does not press the end-direct-wireless-communication button 803 (NO in step S1001), the printing application 302 waits until the user presses the end-direct button 803. The processing described in step S1001 is realized by the CPU 201.

Next, in step S1002, the printing application 302 determines whether a type of the SSID used in the direct wireless communication mode is the onetime SSID or the fixed SSID. The printing application 302 instructs the OS 301 to inquire with the printing apparatus 110 what type of the SSID is used in the direct wireless communication mode. Then, through the control executed by the OS 301, the Bluetooth® I/F 208 executes GATT communication to inquire with the printing apparatus 110 what type of the SSID is used in the direct wireless communication mode. When the Bluetooth® I/F 208 receives a response from the printing apparatus 110, the response is transmitted to the printing application 302 from the OS 301. If the response from the printing apparatus 110 indicates that the type of the SSID used in the direct wireless communication mode is the onetime SSID (YES in step S1002), the processing proceeds to step S1003. If the response from the printing apparatus 110 indicates that the type of the SSID used in the direct wireless communication mode is the fixed SSID (NO in step S1002), the processing proceeds to step S1004. The processing described in step S1002 is realized by the CPU 201.

Next, step S1003 will be described. In step S1003, the printing application 302 instructs the printing apparatus 110 to end the operation of the direct wireless communication mode. The printing application 302 instructs the OS 301 to instruct the printing apparatus 110 to end the operation of the direct wireless communication mode. Then, through the control executed by the OS 301, the Bluetooth® I/F 208 executes GATT communication to instruct the printing apparatus 110 to end the operation of the direct wireless communication mode. The printing apparatus 110, after receipt of the instruction to end the operation of the direct wireless communication mode, ends the operation of the direct wireless communication mode. The operation panel 204 of the mobile terminal 100 displays a notification screen 810 in FIG. 8B. The processing described in step S1003 is realized by the CPU 201.

When the type of the SSID used in the direct wireless communication mode is the onetime SSID, the terminal wirelessly connected to the printing apparatus 110 is only the mobile terminal 100. This is because the maximum number of terminals wirelessly connected to the printing apparatus 110 is set as "1" when the onetime SSID is used. In this case, the operation of the printing apparatus 110 in the direct wireless communication mode can be ended without any problem. Therefore, in the present exemplary embodiment, when the type of the SSID used in the direct wireless communication mode is the onetime SSID, the printing application 302 instructs the printing apparatus 110 to end the operation of the direct wireless communication mode. In other words, the mobile terminal 100 can instruct the printing apparatus 110 to end the operation of the direct wireless communication mode when the type of the SSID used in the direct wireless communication mode is the onetime SSID.

Next, step S1004 will be described. In step S1004, the printing application 302 displays an error screen without ending the operation of the printing apparatus 110 in the direct wireless communication mode. The error screen 820 in FIG. 8C is a screen displayed on the operation panel 204 of the mobile terminal 100 in step S1004. The processing described in step S1004 is realized by the CPU 201.

When the type of the SSID used in the direct wireless communication mode is the fixed SSID, there is a possibility that a terminal other than the mobile terminal 100 is wirelessly connected to the printing apparatus 110. If the operation of the printing apparatus 110 in the direct wireless communication mode is ended in such a state, the wireless connection of another terminal will be also cut off. Therefore, in the present exemplary embodiment, when the type of the SSID used in the direct wireless communication mode is the fixed SSID, the operation of the printing apparatus 110 in the direct wireless communication mode will not be ended. In other words, the mobile terminal 100 is prohibited from instructing the printing apparatus 110 to end the operation of the direct wireless communication mode when the type of the SSID used in the direct wireless communication mode is the fixed SSID.

According to the present exemplary embodiment, when the SSID used in the direct wireless communication mode is the SSID of a specific type (i.e., fixed SSID), the mobile terminal 100 cannot instruct the device to end the operation of the direct wireless communication mode.

When the type of the SSID used in the direct wireless communication mode is the onetime SSID, the mobile terminal 100 can instruct the device to end the operation of the direct wireless communication mode. When the type of the SSID used in the direct wireless communication mode is the fixed SSID, the mobile terminal 100 cannot instruct the device to end the operation of the direct wireless communication mode.

As a variation example of the present exemplary embodiment, the end-direct-wireless-communication button 803 may not be displayed when the type of the SSID used in the direct wireless communication mode is the fixed SSID. When the type of the SSID used in the direct wireless communication mode is the fixed SSID, the mobile terminal 100 can be controlled so as not to execute any processing even if the user presses the end-direct-wireless-communication button 803, while the end-direct-wireless-communication button 803 is displayed.

Hereinafter, a third exemplary embodiment will be described. In the second exemplary embodiment, two types of SSIDs, such as the fixed SSID and the onetime SSID, are assumed as the SSIDs used in the direct wireless communication mode. However, the SSIDs used in the direct wireless communication mode are not limited to the fixed SSID and the onetime SSID, and an SSID of any other type can be used. For example, in addition to the fixed SSID and the onetime SSID, a user SSID that is a dedicated SSID issued to each user logging in the printing apparatus 110 can be used. In step S1002 of FIG. 10, the user SSID can be treated similarly to the onetime SSID or the fixed SSID.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-060645, filed Mar. 24, 2016, which is hereby incorporated by reference herein in its entirety.

What is claimed is:

1. A communication apparatus comprising:
a first communication interface configured to perform a communication that conforms to any one of IEEE802.11 series;
a second communication interface configured to perform a wireless communication that conforms to Bluetooth® Low Energy; and
one or more processors configured to execute a set of instructions to
wirelessly connect the communication apparatus to a printing apparatus operating in a direct wireless communication mode via the first communication interface without using a relay apparatus;
acquire information regarding communication in the direct wireless communication mode from the printing apparatus through Bluetooth® Low Energy communication via the second communication interface;
determine whether to make the printing apparatus stop operation of the direct wireless communication mode based on the acquired information in a case where an instruction for making the printing apparatus stop the operation of the direct wireless communication mode is received from a user; and
instruct the printing apparatus to stop the operation of the direct wireless communication mode via the second communication interface by executing Bluetooth® Low Energy communication in a case where it is determined to make the printing apparatus stop the operation of the direct wireless communication mode.

2. The communication apparatus according to claim 1, wherein the one or more processors executes the instructions to
display an error screen in a case where it is determined not to make the printing apparatus stop the operation of the direct wireless communication mode.

3. The communication apparatus according to claim 1, wherein the information regarding communication in the direct wireless communication acquired from the printing apparatus through Bluetooth® Low Energy communication is information indicating a number of terminals wirelessly connected to the printing apparatus operating in the direct wireless communication mode.

4. The communication apparatus according to claim 3, wherein the one or more processors executes the instructions to
determine to make the printing apparatus stop the operation of the direct wireless communication mode in a case where a number of terminals wirelessly connected to the printing apparatus is 1, and
determine not to make the printing apparatus stop the operation of the direct wireless communication mode in a case where a number of terminals wirelessly connected to the printing apparatus is two or more.

5. The communication apparatus according to claim 1, wherein the information regarding communication in the direct wireless communication acquired from the printing apparatus through Bluetooth® Low Energy communication is information indicating a type of a service set identifier (SSID) used in the direct wireless communication mode.

6. The communication apparatus according to claim 5, wherein the one or more processors executes the instructions to
determine to make the printing apparatus stop the operation of the direct wireless communication mode in a case where a type of the SSID is a first type, and
determine not to make the printing apparatus stop the operation of the direct wireless communication mode in a case where a type of the SSID is a second type.

7. The communication apparatus according to claim 6, wherein the first type is a fixed SSID and the second type is a one-time SSID.

8. The communication apparatus according to claim 1, wherein the one or more processors executes the instructions to
instruct the printing apparatus to start operation of the direct wireless communication mode via the second communication interface by executing Bluetooth® Low Energy communication.

9. A control method for controlling a communication apparatus comprising a first communication interface configured to perform a communication that conforms to any one of IEEE802.11 series and a second communication interface configured to perform a wireless communication that conforms to Bluetooth® Low Energy, the method comprising:
  wirelessly connecting the communication apparatus to the printing apparatus operating in a direct wireless communication mode via the first communication interface without using a relay apparatus;
  acquiring information regarding communication in the direct wireless communication mode from the printing apparatus through Bluetooth® Low Energy communication via the second communication interface;
  determining whether to make the printing apparatus stop operation of the direct wireless communication mode based on the acquired information in a case where an instruction for making the printing apparatus stop the operation of the direct wireless communication mode is received from a user; and
  instructing the printing apparatus to stop the operation of the direct wireless communication mode via the second communication interface by executing Bluetooth® Low Energy communication in a case where it is determined to make the printing apparatus stop the operation of the direct wireless communication mode.

10. The control method according to claim 9 further comprising:
  displaying an error screen in a case where it is determined not to make the printing apparatus stop the operation of the direct wireless communication mode.

11. The control method according to claim 9, wherein the information regarding communication in the direct wireless communication acquired from the printing apparatus through Bluetooth® Low Energy communication is information indicating a number of terminals wirelessly connected to the printing apparatus operating in the direct wireless communication mode.

12. The control method according to claim 11,
  wherein, in a case where a number of terminals wirelessly connected to the printing apparatus is 1, it is determined to make the printing apparatus stop the operation of the direct wireless communication mode, and
  wherein, in a case where a number of terminals wirelessly connected to the printing apparatus is two or more, it is determined not to make the printing apparatus stop the operation of the direct wireless communication mode.

13. The control method according to claim 9, wherein the information regarding communication in the direct wireless communication acquired from the printing apparatus through Bluetooth® Low Energy communication is information indicating a type of an SSID used in the direct wireless communication mode.

14. The control method according to claim 13,
  wherein, in a case where a type of the SSID is a first type, it is determined to make the printing apparatus stop the operation of the direct wireless communication mode, and
  wherein, in a case where a type of the SSID is a second type, it is determined not to make the printing apparatus stop the operation of the direct wireless communication mode.

15. The control method according to claim 9,
  wherein the first type is a fixed SSID and the second type is a one-time SSID.

16. The control method according to claim 9 further comprising:
  instructing a printing apparatus to start operation of the direct wireless communication mode via the second communication interface by executing Bluetooth® Low Energy communication.

17. A non-transitory computer-readable storage medium storing computer-executable instructions causing a computer to execute a control method for controlling a communication apparatus comprising a first communication interface configured to perform a communication that conforms to any one of IEEE802.11 series and a second communication interface configured to perform a wireless communication that conforms to Bluetooth® Low Energy, the control method comprising:
  wirelessly connecting the communication apparatus to the printing apparatus operating in a direct wireless communication mode via the first communication interface without using a relay apparatus;
  acquiring information regarding communication in the direct wireless communication mode from the printing apparatus through Bluetooth® Low Energy communication via the second communication interface;
  determining whether to make the printing apparatus stop operation of the direct wireless communication mode based on the acquired information in a case where an instruction for making the printing apparatus stop the operation of the direct wireless communication mode is received from a user; and
  instructing the printing apparatus to stop the operation of the direct wireless communication mode via the second communication interface by executing Bluetooth® Low Energy communication in a case where it is determined to make the printing apparatus stop the operation of the direct wireless communication mode.

* * * * *